United States Patent [19]

Dierberger et al.

[11] 4,422,300

[45] Dec. 27, 1983

[54] PRESTRESSED COMBUSTOR LINER FOR GAS TURBINE ENGINE

[75] Inventors: James A. Dierberger, Hebron; William Ackermann, East Hartford; Arthur D. Fine, West Hartford, all of Conn.

[73] Assignee: United Technologies Corporation, Hartford, Conn.

[21] Appl. No.: 330,759

[22] Filed: Dec. 14, 1981

[51] Int. Cl.³ ............................................. F02C 7/12
[52] U.S. Cl. ..................................... 60/757; 60/753; 60/754
[58] Field of Search ................. 60/752, 753, 754, 755, 60/757; 110/338

[56] References Cited

U.S. PATENT DOCUMENTS

| | | | |
|---|---|---|---|
| 2,544,538 | 3/1951 | Mahnken et al. | 60/752 |
| 2,919,549 | 1/1960 | Haworth et al. | 60/753 |
| 3,552,178 | 1/1971 | Felgar | 29/447 |
| 3,918,255 | 11/1975 | Holden | 60/753 |
| 3,954,389 | 5/1976 | Szetela | 60/753 |
| 3,956,886 | 5/1976 | Sedgwick | 60/753 |
| 4,030,875 | 6/1977 | Grondahl et al. | 60/760 |
| 4,220,624 | 9/1980 | Austin | 110/338 |

FOREIGN PATENT DOCUMENTS

| | | | |
|---|---|---|---|
| 1211441 | 2/1966 | Fed. Rep. of Germany | 60/752 |
| 200964 | 12/1968 | U.S.S.R. | 60/757 |

Primary Examiner—Louis J. Casaregola
Assistant Examiner—Timothy S. Thorpe
Attorney, Agent, or Firm—Norman Friedland

[57] ABSTRACT

The walls of the liner of a gas turbine combustor are segmented and disposed axially and circumferentially to define a combustion chamber. The liner is formed by radially spaced walls preferably fabricated from a ceramic or other high temperature brittle material. The wall adjacent the hot combustion products is prestressed at room temperature and the juxtaposed wall is cooperatively shaped to define a supporting frame for the prestressed wall so as to minimize the overall stresses occasioned in the hostile environment to which the prestressed wall is subjected.

3 Claims, 3 Drawing Figures

PRESTRESSED COMBUSTOR LINER FOR GAS TURBINE ENGINE

TECHNICAL FIELD

This invention relates to combustors for a gas turbine engine and more particularly to the fabrication thereof by a twin-walled configuration where the wall adjacent the hot gases is prestressed at room temperature.

BACKGROUND ART

As is well known, the aircraft industry is in a perpetual program to improve its products and in particular the engine manufacturers are constantly looking for a longer lasting combustor. This, of course, is occasioned by the need not only for improving the life and maintainability of the engine but also to improve fuel consumption by improving engine performance. Generally, one of the consequences resulting from increasing engine performance is the raising of the temperature at which the combustor is fired. This has given rise to investigating not only new materials but also different combustor liner constructions and cooling techniques.

This invention addresses a new scheme for fabricating the liners that form the combustion chamber. As will be appreciated, current burners in gas turbine engines are made of ductile alloys in a full hoop configuration. The primary cooling mechanism is the use of compressor discharge air for film cooling. The structure that allows the film to be injected into the combustion zone promotes the hot wall/cold wall thermal fight that ultimately leads to failure. The trend in advanced designs is to depart from the full hoop concept in favor of a series of discrete segments. The use of the segments allows higher temperature "turbine" alloys to be used to better withstand the operating environment. The intent is to reduce the thermal fight to increase life.

Unfortunately, the use of segments introduces a leakage path around each segment that must be sealed. In sealing this, some current designs reintroduce the thermal fight into the segment. This causes high stress in the segment and ultimately causes failure due to thermal fatigue.

We have found that we can obviate the problems alluded to above by prestressing the liner wall that confines the combustion products and forming the combustor by a plurality of segments that are segmented in the circumferential and axial directions. According to this invention each segment is formed from a flat blank into a curved-like member and is disposed to overlie a support frame that has four sides depending from a flat plate. The upper surface of each of the sides is contoured to a predetermined shape that conforms to the shape the prestressed wall will assume when at its intended temperature occasioned by firing the combustor. Clamping the segment to bear against the upper surfaces serves to seal the edges of each segment. It should now be obvious to one skilled in the art that each segment could as well be formed from a curved blank into a flat-like member.

DISCLOSURE OF INVENTION

An object of this invention is to provide for a gas turbine engine an improved combustor liner. A feature is to provide a plurality of rectangularly (although other shapes may be utilized) shaped plate-like members segmented in an axial and circumferential direction to define a combustor, with each segment being mechanically prestressed at a relatively low temperature to assume the shape of that particular segment when the engine is operative. Each prestressed wall is supported by a frame having four depending sides supporting the four edges of each of said plate-like prestressed wall.

Other features and advantages will be apparent from the specification and claims and from the accompanying drawings which illustrate an embodiment of the invention.

BEST MODE FOR CARRYING OUT THE INVENTION

As will be appreciated by one skilled in this art the liner wall for a gas turbine engine combustor may be utilized on any type of combustor, as for example, burner can, annular or co-annular types and the invention need not be limited to gas turbine power plants. However, it will be noted that the invention is particularly efficacious when used on aircraft applications particularly in the higher turbine inlet temperature models. An example of engines where such a design employing this invention may be utilized is the JT9D and F-100 engine models that are manufactured by Pratt & Whitney Aircraft Group division of United Technologies Corporation, the assignee of this patent application.

Figure 1:
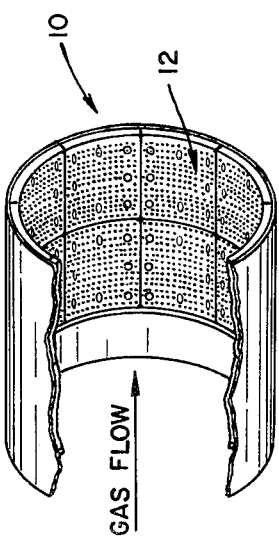
FIG. 1 is a partial perspective view of a combustor liner.
Figure 2:
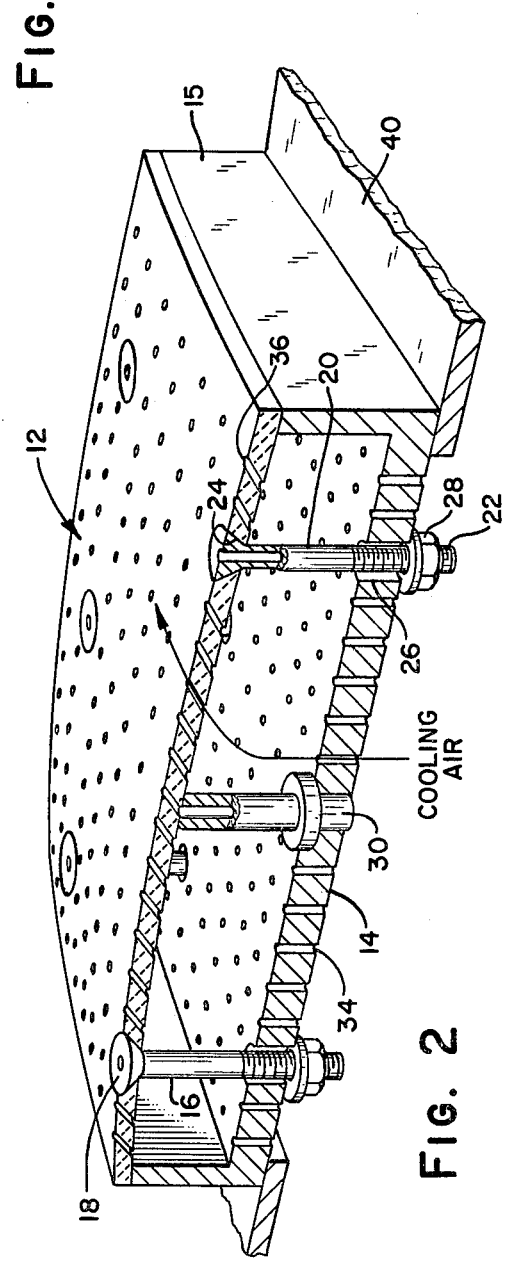
FIG. 2 is a partial view showing the details of a segment of the segmented components.

As noted from FIGS. 1 and 2 the liner of the combustor generally indicated by reference numeral 10, (only a partial showing is depicted) is formed from a plurality of plate-like members 12 each forming a segment disposed circumferentially and axially to form the combustion chamber. As noted the hot gases generated in the combustion chamber flow over the face of these members 12 and the temperature is, at times, in excess of 2500° F. As is customary with combustor liners, means are provided to cool the liner and this is accomplished by shrouding the liner in a cavity filled with compressor discharge air and providing cooling means, such as the transpiration cooling mechanism as disclosed herein. Obviously, other means may be employed without departing from the scope of this invention.

As noted from FIG. 2 showing a partial view of a single segment as comprising the plate-like rectangularly shaped segment 12 supported to the backing plate 14. Backing plate 14 carries four depending side walls that are contiguous with the four edges of segment 12. The upper surface or face of each side wall 15 is contoured to define a profile that conforms to the shape that plate-like segment 12 will assume when at its operating temperature (say, 2000° F.).

To mechanically prestress the plate-like segment 12, it is oriented into the proper position relative to the backing plate 14 and clamped into position by a plurality of clamp members 16. Clamp member 16 may be rivet-like element that has a head portion 18, shank 20 and threaded portion 22 and extend from the upper surface of segment 12 through an opening 24 formed therein through an enlarged opening 26 formed on the backing plate 14. Nut 28 serves to urge the plate against the surfaces on side wall 15 until it bears thereagainst so that it becomes a tight fit, yet having sufficient freedom to move when expanded in the heated condition. Center post 30 supports the middle of the segment 12 and it also allows freedom of movement at the higher temperature levels.

Burner shell is a cylindrical member 40 to which segment assemblies are fixed.

While any type of available material can be employed as the backing plate 14 since it is in the cooler environment, preferably the segment 12 would be fabricated from a ceramic or low ductile high temperature material.

Figure 3:
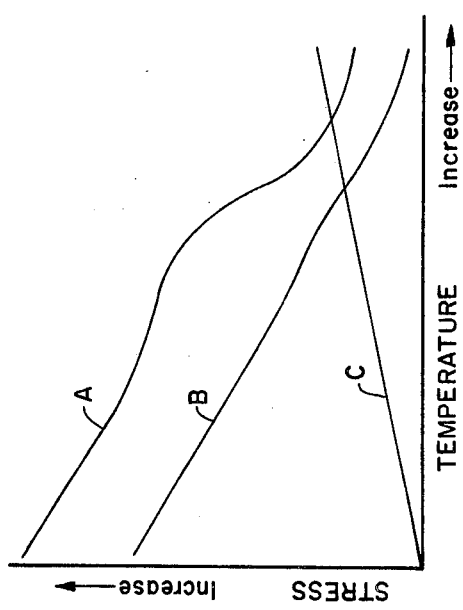
FIG. 3 is a temperature-stress curve of certain component parts.

FIG. 3 shows several plots of relevant stress versus temperature. Curve A represents the yield stress response and curve B is a suitable prestress to achieve a desired low stress value at the higher operating temperature. Curve C shows conventional segment response. Since the segment assumes the shape it wants at the higher operating temperature it will exhibit low stress resulting in an improvement in the creep and plastic damage characteristics of the material when compared with heretofore combustor liners.

Additionally, because of the overload strain resulting from prestressing at room temperature (say 70° F.) crack propagation will be minimized hence improving the fatigue life of the liner.

Cooling is effectuated by providing a plurality of impingement holes 34 to back-up plate 14 leading compressor cooling air to impinge on the underneath surface of segment 12. A plurality of apertures 36 are formed in the segment 12 and are angularly disposed relative to the flow of impingement air to be discharged in a direction generally parallel to the flow of the combustion air. This serves to form a film of cooling air over the exposed surface of segment 12.

It should be understood that the invention is not limited to the particular embodiments shown and described herein, but that various changes and modifications may be made without departing from the spirit and scope of this novel concept as defined by the following claims.

We claim:

1. A combustor having a liner formed from a plurality of segments supported on a frame in an axial and circumferential direction defining an annularly shaped combustion chamber, each frame being a relatively open ended box-like member having radially extending side walls complimenting the shape of its cooperating segment so that the side edge of each segment is contiguous with the top surface of said side walls, means for affixing said segments to the frame and for supporting said segments so that each are prestressed to bear against the top surface of said side walls, whereby said segment distorts when said combustor is operating at its normal temperature level and is in a relatively free stress condition, and means for cooling said segments to its operating temperature.

2. A combustor as in claim 1 wherein said cooling means includes a plurality of openings in the bottom wall of said box-like member for leading cooling air to impinge on the underside of each of said segments and opening in said segment for discharging said cooling air into said combustor.

3. A combustor as in claim 2 wherein said openings in said segment are oriented such that the flow discharging therein is substantially in the same direction as the flow of gases in said combustor.

* * * * *